United States Patent [19]

Guise

[11] 4,124,553

[45] Nov. 7, 1978

[54] METHOD FOR THE PREPARATION OF A COMPOSITION CONTAINING POLYCARBAMOYL SULPHONATES FROM POLYISOCYANATES

[75] Inventor: Geoffrey B. Guise, Highton, Australia

[73] Assignee: Commonwealth Scientific and Industrial Research Organization, Australia

[21] Appl. No.: 746,729

[22] Filed: Dec. 2, 1976

[30] Foreign Application Priority Data

Dec. 5, 1975 [AU] Australia .............................. 4203/75

[51] Int. Cl.² .......................... C08J 3/10; C08L 81/08; D06M 13/00
[52] U.S. Cl. ........................... 260/29.2 TN; 8/128 A; 8/192; 8/DIG. 11; 260/29.6 NR; 427/390 R; 427/394; 528/45; 528/59; 528/48; 528/65; 528/66; 528/71
[58] Field of Search ..................... 260/29.6 Z, 29.6 N, 260/29.6 E, 29.6 NR, 29.2 TN, 77.5 AT, 77.5 TB; 427/390 R, 394

[56] References Cited

FOREIGN PATENT DOCUMENTS 460,168 4/1975 Australia.

OTHER PUBLICATIONS

Handbook of Chemistry and Physics, Chemical Rubber Co., 47th Edition, pp. C-74 & C-84.

*Primary Examiner*—Allan Lieberman
*Attorney, Agent, or Firm*—Dennis P. Clarke

[57] ABSTRACT

A method for the preparation of a composition containing PCS from polyisocyanates which comprises the following steps in the stated order:

Step 1: Mixing a polyisocyanate with
  (a) an aqueous solution of an alkali metal or ammonium bisulphite or metabisulphite, or an aqueous solution of a mixture of any two or more of these salts, and
  (b) a compound or mixture of compounds containing on average one or more tertiary amino group per molecule, and
  (c) at least one water miscible solvent containing a hydroxy and/or ether group.

Step 2: Mixing the reaction mixture from Step 1 with either or both of
  (d) at least one mineral acid or a solution thereof
  (e) an aqueous dispersion, emulsion, or latex of at least one water-insoluble organic polymer prepared from the polymerization of at least one ethylenically unsaturated monomer or an organic polymer containing a plurality of urethane linkages.

18 Claims, No Drawings

METHOD FOR THE PREPARATION OF A COMPOSITION CONTAINING POLYCARBAMOYL SULPHONATES FROM POLYISOCYANATES

The present invention describes an improved method for the preparation of compositions containing polycarbamoyl sulphonates (hereafter abbreviated to PCS), i.e. compounds or mixtures of compounds containing on average per molecule two or more substituents of the type $-NHCOSO_3^- X^+$, where $X^+$ is a monovalent cation or cations or one equivalent of a polyvalent cation or cations such that there is electrical neutrality.

In U.S. Pat. No. 3,898,197 a method of preparing PCS was described in which a compound or mixture of compounds containing on average per molecule two or more isocyanate groups (hereafter referred to as polyisocyanates) was reacted with bisulphite salts in a mixture of water and a water miscible organic solvent. It was subsequently found that these methods with certain polyisocyanates, particularly those in which the isocyanate groups are attached to aromatic rings, some of the isocyanate groups were not converted into carbamoyl sulphonates and instead underwent other reactions.

Improved methods have now been found whereby the isocyanate groups of such polyisocyanates may be converted in high yield into carbamoyl sulphonate groups and this is the basis of the present invention. Accordingly, there is provided a method for the preparation of a composition containing PCS from polyisocyanates which comprises the following steps in the stated order:

Step 1: Mixing a polyisocyanate (as defined above) with
(a) an aqueous solution of an alkali metal (preferably sodium, potassium or lithium) or ammonium bisulphite or metabisulphite, or an aqueous solution of a mixture of any two or more of these salts, and
(b) a compound or mixture of compounds containing on average one or more tertiary amino group per molecule, and
(c) at least one water miscible solvent containing a hydroxyl and/or ether group.

Step 2: Mixing the reaction mixture from Step 1 with either or both of
(d) at least one mineral acid or a solution thereof
(e) an aqueous dispersion, emulsion, or latex of at least one water-insoluble organic polymer prepared from the polymerisation of at least one ethylenically unsaturated monomer, or an organic polymer containing a plurality of urethane linkages.

The proportions of reactants in Step 1 have been found to be critical to obtain high conversions of isocyanate groups into carbamoyl sulphonates, and this is illustrated in the examples below. For each mole of isocyanate groups of the polyisocyanate there should be at least one mole of bisulphite ion (or equivalent ions such as metabisulphite or sulphite), and most preferably from 1.05 to 1.5 moles. The number of moles of tertiary amino groups in component (b) should be equal to or preferably less than but not greater than the number of moles in (a) of bisulphite ions (or their equivalents). A particular preferred composition is one which for each isocyanate group component (a) contains $(1 + X)$ moles of bisulphite ions (or their equivalents) and component (b) contains X moles of tertiary amino groups, where X is from 0.1 to 0.5, preferably from 0.2 to 0.4.

Polyisocyanates suitable for the present invention have been discussed in U.S. Pat. No. 3,898,197. The preferred polyisocyanates for the present invention are prepared by the reaction of
(f) a compound of mixture of compounds containing on average two or more isocyanate groups per molecule, and
(g) A compound or mixture of compounds with two or more groups drawn from one or more of the following classes: hydroxyl, thiol, primary amino, secondary amino or carboxylic acid.

The preferred isocyanates for (f) are those in which the isocyanate groups are attached to aromatic rings although aliphatic isocyanates are also suitable. The most preferred reactants for (f) are 2,4-tolylene diisocyanate, mixtures of 2,4- and 2,6-tolylene diisocyanates, and the isomeric diphenylmethanediisocyanates.

Suitable reactants for (g) include polyethers, polyesters, polycaprolactones or polybutadienes with hydroxyl or amino groups, and the most preferred are polypropylene oxide diols or triols, and polyoxytetramethylene glycols.

The bisulphite and/or metabisulphite salts of (a) may be partially replaced by the corresponding sulphite salts.

The tertiary amino groups of (b) may be of the type $R^1R^2R^3N$ where $R^1$, $R^2$ and $R^3$ may be alkyl, aryl, or cycloalkyl groups or those groups may be joined together to form rings which may or may not be aromatic. The preferred components (b) include those in which $R^1$, $R^2$ and $R^3$ are alkyl groups with, from one to five carbon atoms, benzyl groups or those in which $R^1$ and $R^2$ form part of a saturated five or six membered ring. The most preferred tertiary amine components (b) are, trimethylamine, triethylamine, triethanolamine, dimethylethanolamine, tribenzylamine, N-ethylmorpholine, N-methylpiperidine, N-methylpyrollidine and the like. The component (b) may contain two tertiary amino groups, and suitable examples include, tetra-N-methylethylene diamine, triethylene diamine (i.e. 1,4-diazabicyclo[2,2,2]octane) and 1,4-dimethyl-piperazine. A number of preparations containing suitable tertiary amines are commercially available for use as catalysts for the preparation of polyurethanes or for curing polyepoxides (for example see H. Lee and K. Neville, Handbook of Epoxy Resins, McGraw-Hill 1967, chapter 9).

It has been found that all tertiary amines are not equally effective for use as component (b), and this is illustrated in the examples below. The most effective tertiary amines are those in which the tertiary amino group or groups have a pK value in excess of 9.

The preferred solvents for component (c) are lower aliphatic alcohols with from one to six carbon atoms, ethylene glycol, propylene glycol, diethylene glycol, the mono and di ethers of the previously mentioned glycols with lower aliphatic alcohols, or cyclic ethers, used alone or mixed with each other. The most preferred solvents are ethanol, n-propanol, iso-propanol, 2-methoxyethanol, 2-ethoxyethanol, ethylene glycol dimethyl ether, diethylene glycol dimethyl or diethyl ethers, dioxan, tetrahydrofuran or tetrahydrofurfuryl alcohol. The component (c) may contain up to 25% by weight of a water immiscible solvent such as ethyl acetate, diethyl ether, toluene, xylene, perchloroethylene, the acetates of ethylene glycol monomethyl or monoethyl ethers, and the like. In addition the component (c) may contain up to 50% by weight of a water miscible organic solvent such as dimethylformamide, dimethylacetamide, dimethylsulphoxide, acetone, methyl ethyl ketone, hexamethylphosphorotriamide, sulpholane, or the like.

The preferred mineral acids for component (e) are hydrochloric, hydrobromic, sulphuric, or phosphoric acid.

The preferred polymers for component (f) are those derived from the polymerisation of one or more ethylenically unsaturated monomers, and in particular those derived from a monomer mixture containing 50% by weight of esters of acrylic or methacrylic acids with lower aliphatic alcohols, for example, butyl acrylate, ethyl acrylate, butyl methacrylate. Examples of suitable commercial products of this type have been given in our U.S. Pat. No. 3,898,197.

The mixing in Step 1 of the polyisocyanate and components (a), (b) and (c) may be in any order and is preferably performed at room or lower temperatures. To minimise isocyanate hydrolysis or reaction of the isocyanate with the solvent in the case of hydroxylic solvents, it is preferable to mix (a), (b) and (c) together and add this mixture to the polyisocyanate, or to add (a), (b) and (c) to the polyisocyanate separately but simultaneously or to add at the same time a mixture of any two and the third. In the case of mixtures of (a), (b) and (c) where (a) is an aqueous solution of sodium bisulphite or metabisulphite, crystalline sodium sulphite may separate on standing if the water concentration is low. The supernatant solution is still effective for conversion of polyisocyanates into PCS. It is even possible to separate the sodium sulphite and use only the solution. Such solutions will in effect contain the tertiary ammonium sulphite as well as sodium bisulphite. In such cases the initial bisulphite concentration must be such that after removal of the crystalline sodium sulphite the solutions contain at least one mole of bisulphite per mole isocyanate groups. Such solutions, as they contain low water concentrations, are particularly suited for the conversion of hydrophobic polyisocyanates into PCS for example those with polyester or polybutadiene backbones. The methods of U.S. Pat. No. 3,898,197 when applied to hydrophobic polyisocyanates give low conversion of isocyanates into carbamoyl sulphonates, as the water present usually results in precipitation of the polyisocyanate.

The proportions of water and water miscible solvent (c) in the reaction mixture of Step 1 have also been found to be critical to obtain high conversions of isocyanate groups into carbamoyl sulphonates and this is illustrated in the examples below. For example, with polyisocyanates derived from tolylene diisocyanate and polypropylene oxide diols and/or triols, the preferred solvents are ethanol-water or isopropanol-water containing by weight between 50-70% alcohol and most preferably about 60% alcohol.

The PCS containing compositions prepared by the methods of the present invention are suited for the treatment of fibrous materials, for example using the methods of U.S. Pat. No. 3,898,197 and U.S. patent application Ser. No. 461,134 and to impart resistance to felting shrinkage in textile materials containing wool and to improve the properties of paper and other textile materials. Such PCS may also find other applications, for example as surface coatings, adhesives, binders for nonwoven materials and for the production of elastomers.

EXAMPLES

The following examples are provided to illustrate the invention. Percentages are by weight unless otherwise stated.

The solutions of sodium or potassium bisulphite used below were prepared by the dissolving in water of corresponding metabisulphite salts which we found by analysis to be 95-97% pure. It is to be appreciated that such solutions will contain the following ions, bisulphite, metabisulphite and sulphite.

The isocyanate content of the polyisocyanates was determined by allowing a sample to react with excess di-n-butylamine in dry dioxan for about 5 minutes. The excess amine was then determined by titration with 0.1N HCl in water to the bromophenol blue end point.

The extent of conversion of ioscyanates to carbamoyl sulphonates was determined by decomposing a sample with alkali and estimating the sulphite released iodometrically by the following method. An aliquot (5 g) of the PCS was weighed into a 250 ml conical flask and dissolved in a mixture of water (75 ml) and isopropanol (100 ml). This was titrated against 0.05M iodine solution containing potassium iodide to the iodine colour endpoint. 30% w/v sodium hydroxide solution (10 ml) was added and after 2-5 minutes the solution was acidified with 20% w/v sulphuric acid (25 ml) and immediately titrated again with 0.05M iodine solution. The first titre gives the free bisulphite content of the PCS and the second titre gives the carbamoyl sulphonate content.

Shrink Resist Effectiveness

To determine the effectiveness in shrink resisting wool fabrics, a sample of the PCS preparation was diluted with 0.5% sodium bicarbonate solution to give a solution containing 3% polymer. This was then padded at 100% pick-up with a laboratory mangle onto plain weave worsted wool fabric (150 g/m$^2$). Samples were cured in a laboratory Konrad Peter Tenter for 5 minutes at 105° C. The area shrinkage was then measured on relaxed samples after a 3 hour wash in a 50 l Cubex International Machine with 12.5 l wash liquor pH 7.5, 40° C. using a load of 1 kg of samples and polyester weighting squares. The untreated fabric after this wash test shrank 70% in area whereas if effective, the treated samples shrank not more than 8% in area under these conditions.

EXAMPLE 1

This example demonstrates the preparation of PCS from a polyether polyisocyanate derived from a polypropylene oxide triol, molecular weight 3000 and 2,4-tolylene diisocyanate.

Polyisocyanate Preparation

A polypropylene oxide triol, molecular weight 3000 (1750 g of Desmophen 3400, Bayer) was dried by azeotropic distillation with toluene, and then heated under nitrogen at 60° for 4 hours with 2,4-tolylene diisocyanate (335 g of Desmodur T-100, Bayer). This gave a polyisocyanate of isocyanate content 4.1%.

Preparation of PCS Using Tertiary Amines (Step 1)

To a vigorously stirred sample of the polyisocyanate (10 g) dissolved in dry dioxan (2.5 g) and isopropanol (32.3 ml) was added immediately followed by an aqueous solution (32.3 ml) was added immediately followed by an aqueous solution (total weight 18.1 g) in which the reactants listed below, were dissolved. After 10 minutes a sample was removed and the carbamoyl sulphonate content determined. Control experiments showed that the maximum conversion of isocyanate groups to carbamoyl sulphonates was achieved after 4-7 minutes, and by 10 minutes this had dropped at most 2%.

present invention and demonstrate that the addition of certain tertiary amines results in good conversions into PCS. Experiments 15-21 demonstrate that the nature of the tertiary amine is important and that some are more effective than others, particularly those with more basic tertiary amino groups.

Experiment 22 demonstrates that the addition of an organometallic catalyst known to catalyse certain isocyanate reactions is ineffective.

| Experiment No. | No. of Moles of Reactant per Mole of Isocyanate Groups | % Conversion of Isocyanate Groups into Carbamoyl Sulphonates |
|---|---|---|
| 1 | 1.2 $NaHSO_3$ | 14 |
| 2 | 1.5 $NaHSO_3$ | 17 |
| 3 | 1.2 $KHSO_3$ | 13 |
| 4 | 1.2 $NaHSO_3$ + 0.1 triethylamine | 68 |
| 5 | 1.2 $NaHSO_3$ + 0.2 triethylamine | 74 |
| 6 | 1.2 $NaHSO_3$ + 0.4 triethylamine | 75 |
| 7 | 1.2 $NaHSO_3$ + 0.6 triethylamine | 73 |
| 8 | 1.4 $NaHSO_3$ + 0.1 triethylamine | 66 |
| 9 | 1.4 $NaHSO_3$ + 0.2 triethylamine | 73 |
| 10 | 1.4 $NaHSO_3$ + 0.4 triethylamine | 80 |
| 11 | 1.0 $NaHSO_3$ + 0.2 triethylamine | 72 |
| 12 | 1.0 $NaHSO_3$ + 0.1 $Na_2SO_3$ + 0.1 triethylamine | 74 |
| 13 | 1.2 $NaHSO_3$ + 0.1 $Na_2SO_3$ + 0.1 triethylamine | 71 |
| 14 | 1.2 $KHSO_3$ + 0.2 triethylamine | 72 |
| 15 | 1.2 $NaHSO_3$ + 0.1 pyridine | 17 |
| 16 | 1.2 $NaHSO_2$ + 0.2 2-methylpyridine | 33 |
| 17 | 1.2 $NaHSO_3$ + 0.2 2,4,6-trimethylpyridine | 64 |
| 18 | 1.2 $NaHSO_3$ + 0.2 N,N,-dimethylaniline | 10 |
| 19 | 1.2 $NaHSO_3$ + 0.2 tri-n-butylamine | 75 |
| 20 | 1.2 $NaHSO_3$ + 0.2 triethanolamine | 73 |
| 21 | 1.2 $NaHSO_3$ + 0.1 1,4-diazabicyclooctane | 73 |
| 22 | 1.2 $NaHSO_3$ + 0.05 Dibutyltin dilaurate | 17 |

Dilution with water of samples of the preparations from experiments 1-3, 15, 16, 18 and 22 gave a precipitate, whereas the products from the other experiments were freely water soluble.

Experiments 1-3 are in accordance with the teachings of U.S. Pat. No. 3,898,197. Such methods using bisulphite salts alone result in low conversions of the above polyisocyanate into PCS, whereas these methods with the corresponding polyisocyanate prepared from Desmophen 3400 and hexamethylene diisocyanate gave over 90% conversion of the isocyanate groups into carbamoyl sulphonates.

Experiments 4-15 inclusive 16, and 19-21 inclusive, represent examples of the preferred methods of the

Solvent Composition

The solvent composition was found to markedly influence the extent of conversion of isocyanate groups into carbamoyl sulphonates. In the following examples to a well stirred solution of the polyisocyanate (10 g) in dry dioxan (2.5 g), the organic solvent was added immediately followed by an aqueous solution containing sodium metabisulphite (1.16 g) and triethylamine (0.2 g). Reaction mixtures with various total solids contents and solvent:water proportions were investigated.

| Experiment No. | Solvent-Water Comparison in Reaction Mixture % weight/weight | Total Solids Content % by Weight | % Conversion of Isocyanate Groups into Carbamoyl Sulphonates |
|---|---|---|---|
| 22 | 60% isopropanol | 5 | 72 |
| 23 | 60% isopropanol | 10 | 78 |
| 24 | 60% isopropanol | 15 | 79 |
| 25 | 60% isopropanol | 20 | 74 |
| 26 | 60% isopropanol | 25 | 69 |
| 27 | 60% isopropanol | 30 | 55 |
| 28 | 60% isopropanol | 35 | 42 |
| 29 | 40% isopropanol | 25 | 24 |
| 30 | 50% isopropanol | 25 | 61 |
| 31 | 55% isopropanol | 25 | 66 |
| 32 | 65% isopropanol | 25 | 62 |
| 33 | 70% isopropanol | 25 | 46 |
| 34 | 80% isopropanol | 25 | 36 |
| 35 | 50% ethanol | 25 | 36 |
| 36 | 60% ethanol | 25 | 69 |
| 37 | 70% ethanol | 25 | 52 |
| 38 | 80% ethanol | 25 | 18 |
| 39 | 60% ethanol | 15 | 70 |
| 40 | 60% ethanol | 20 | 69 |
| 41 | 60% ethanol | 30 | 65 |
| 42 | 60% methylated spirits | 25 | 55 |
| 43 | 60% methanol | 25 | 23 |
| 44 | 60% n-propanol | 25 | 66 |
| 45 | 60% sec-butanol | 25 | 18 |
| 46 | 60% t-butanol | 25 | 49 |
| 47 | 60% 2-methoxyethanol | 25 | 17 |

-continued

| Experiment No. | Solvent-Water Comparison in Reaction Mixture % weight/weight | Total Solids Content % by Weight | % Conversion of Isocyanate Groups into Carbamoyl Sulphonates |
|---|---|---|---|
| 48 | 60% 2-ethoxyethanol | 25 | 15 |
| 49 | 60% dioxan | 25 | 24 |
| 50 | 60% dimethylformamide | 25 | 9 |
| 51 | 60% 1,2-dimethoxyethane | 25 | 17 |
| 52 | 60% tetrahydrofurfurylalcohol | 25 | 15 |
| 53 | 60% diethylene glycol diethyl ether | 25 | 15 |

The result in experiment 42 probably reflects the presence of acidic impurities.

Step 2

The PCS preparations from above in experiments 4–14, 17, and 19–21 contained the maximum carbamoyl sulphonate content after 4–7 minutes, and this then slowly declined. After 2–4 days at room temperature the preparations had separated into two layers and addition of water gave an insoluble precipitate. Stable compositions suitable for the treatment of fibrous materials could be prepared by the following methods.

Method 1

The PCS solution from step 1 (for example that from experiment 5) 10–30 minutes after the commencement of the preparation was mixed with a mixture of concentrated hydrochloric acid and isopropanol (1:4, by volume) at the rate of 2–4 ml per 100g of PCS. The resultant solution had a yellow colour due to dissolved sulphur dioxide, had an apparent pH in the range 1–3, and was found to be stable to prolonged storage at room temperature. Samples after 3 months storage at room temperature were found to contain at least 95% of the original carbamoyl sulphonate group content.

Method 2

The PCS solution from step 1, for example that from experiment 5, 10–30 minutes after the commencement of the preparation was diluted with water and added to an equal weight of well stirred Primal K3 (Rohm and Haas) (a poly(butylacrylate) latex). This gave a stable concentrated mixture of 30% solids content, which was found to be stable after prolonged storage at room temperature.

Method 3

The stable concentrated mixture from method 2 was adjusted to pH 3–3.5 by the addition of a 1–5% solution of hydrochloric acid in water, and then diluted with water to 25% solids. This product had a slightly longer shelf-life than that from method 2.

Shrink Resist Effectiveness

Samples from methods 1–3 passed on the PCS preparations from experiments 4–14, 17, 19–21, 22–26, 30–32, 36, 39–40 and 44 were diluted with water to give a 3% solution, adjusted to pH by the addition of 5% sodium carbonate solution, and padded on to wool fabrics as described above. In all cases the fabric samples showed less than 4% area shrinkage after a 3 hour wash test.

EXAMPLE 2

This example demonstrates the conversion into PCS of a number of polyisocyanates prepared from polyether polyols and aromatic diisocyanates.

Preparation of Polyisocyanates

The polyols were dried by azeotropic distillation with toluene. The polyol was then heated in the absence of solvent, under nitrogen, under conditions in the following table.

| Polyisocyanate No. | Polyol | Diisocyanate | Heating Time | Temp. | % Isocyanate Cont. |
|---|---|---|---|---|---|
| 1 | Desmophen 3400[a] (900g) | Desmodur T65[d] (172g) | 6 | 60–65 | 4.2 |
| 2 | Desmophen 3400[b] (900g) | Desmodur T80[e] (172g) | 5 | " | 3.9 |
| 3 | Desmophen 3600[b] (800g) | Desmodur T65[d] (157g) | 5.5 | " | 4.1 |
| 4 | Desmophen 3600[b] (800g) | Desmodur T80[e] (157g) | 4 | " | 4.0 |
| 5 | Desmophen 3600[b] (500g) | Desmodur T100[f] (87g) | 4 | " | 3.8 |
| 6 | Desmophen 3300[c] (900g) | Desmodur T100[f] (123g) | 4 | " | 3.5 |
| 7 | Desmophen 3900[c] (900g) | Desmodur T100[f] (102g) | 4 | " | 2.8 |

[a]Bayer : Polypropylene oxide triol, MW = 3000
[b]Bayer : Polypropylene oxide diol, MW = 2000
[c]Bayer : Polyether polyols
[d]Bayer : 2,4- and 2,6-tolylene diisocyanate mixture 65% 2,4-isomer
[e]Bayer : as d but 80% 2,4-isomer
[f]Bayer : 2,4-tolylene diisocyanate

Preparation of PCS

To a stirred solution of the polyisocyanate (10 g) in dioxan (3 g), isopropanol (25 ml) was added immediately followed by a solution in water (15 ml) containing 1.2 moles of sodium bisulphite and 0.2 moles of triethylamine per mole of isocyanate groups. After 10 minutes a sample was removed and the carbamoyl sulphonate content determined to give the following results:

| Polyisocyanate | % Conversion of Isocyanate Groups into Carbamoyl Sulphonates |
| --- | --- |
| 1 | 72 |
| 2 | 76 |
| 3 | 72 |
| 4 | 74 |
| 5 | 78 |
| 6 | 77 |
| 7 | 80 |

In control experiments in which the triethylamine was omitted only 15–20% conversion to carbamoyl sulphonates occurred, giving water-insoluble products. The products from the above experiments were freely water-soluble. The PCS would be converted into stable compositions by the methods 1, 2 and 3 of example 1, and such compositions were found to be effective for shrink-resisting wool fabric.

EXAMPLE 3

This example demonstrates the conversion of a number of commercial polyisocyanates derived from aromatic diisocyanates into PCS. The polyisocyanate (10 g) was dissolved in dioxan (3 g) and stirred vigorously. Isopropanol was added immediately followed by an aqueous solution containing 1.2 moles of sodium bisulphite and 0.2 moles of triethylamine per mole of isocyanate groups

| Product | % Isocyan. Content | Volume of Isopropanol | Volume of Water | % Conversion of Isocyan. Groups to Carbamoyl Sulphonates |
| --- | --- | --- | --- | --- |
| 1. Desmodur E14 (Bayer) | 3.5 | 25 | 15 | 72 |
| 2. Helastic 10147-LV (Wilmington) | 3.9 | 25 | 15 | 77 |
| 3. Castomer E-002 (Witco) | 4.3 | 25 | 15 | 70 |
| 4. Castomer E-0027 (Witco) | 3.3 | 25 | 15 | 76 |
| 5. Adiprene L-100 (du Pont) | 4.2 | 40 | 25 | 67 |

In control experiments in which the triethylamine was omitted only 15–20% conversion to carbamoyl sulphonates occurred giving water-insoluble products. The products from the above experiments were freely water-soluble. The PCS could be converted into stable compositions by methods 1, 2 and 3 of example 1, and such compositions were found to be effective for shrink-resisting wool fabric.

EXAMPLE 4

This example illustrates the use of the commercial diisocyanate, DDI (General Mills Chemicals), which is derived from dimerised fatty acids and has a molecular weight of about 600. DDI is hydrophobic, is only slightly soluble in ethanol or isopropanol, and is precipitated from other water-miscible solvents such as n-propanol or dioxan by the addition of only small amounts of water. Thus attempts to prepare the carbamoyl sulphonate of DDI by the methods of U.S. Pat. No. 3,898,197 using water miscible-solvents and aqueous sodium bisulphite solutions were unsuccessful. If there was sufficient water present to dissolve the bisulphite the DDI precipitated, whereas the use of water concentration below that which would cause the DDI to precipitate resulted in precipitation of the bisulphite.

A solution of composition approximating to "triethylaminonium sulphite" was prepared as follows: a solution of sodium metabisulphite (10 g) in water (25 ml) was added to a solution of triethylamine (10.6 g) in n-propanol (100 ml) and mixed thoroughly. A crystalline precipitate formed immediately and after 20 minutes was filtered off and discarded. The solution contained 0.4 milli equivalents of bisulphite per gram.

The above n-propanol solution (30 ml) was added to a solution of DDI (3 g) in dioxan (15 ml). After 20 minutes, 20% w/v sulphuric acid (2 ml) was added and the mixture concentrated in vacuo below 30°, to give an oil which was freely soluble in water; iodiometric titration showed that 90% of the isocyanate groups had been converted into carbamoyl sulphonates.

Similar results were obtained when isopropanol or ethanol were substituted for n-propanol, or 40% ammonium bisulphite solution or potassium metabisulphite solution was substituted for sodium metabisulphite.

To treat wool fabric the acidified PCS was diluted to 4% solids and adjusted to pH 7.5 by the addition of sodium bicarbonate. Samples were padded with solution, dried and cured by steaming for 30 minutes. Samples so treated showed less than 4% area shrinkage after 3 hours in the above wash test.

I claim:

1. A method for the preparation of a composition containing polycarbamoyl sulphonates from polyisocyanates which comprises the following steps in the stated order:

Step 1: Mixing a polyisocyanate with (a) an aqueous solution of an alkali metal or ammonium bisulphite or metabisulphite, or an aqueous solution of a mixture of any two or more of these salts;

(b) one or more tertiary amines containing on average per molecule one or more tertiary amino groups of the type $R^1R^2R^3N$ where $R^1$, $R^2$ and $R^3$ are each alkyl, aryl, or cycloalkyl groups or two or more of the groups $R^1$, $R^2$ and $R^3$ together form alicyclic or aromatic rings; and (c) at least one water-miscible solvent selected from the group consisting of: lower aliphatic alcohols with from one to six carbon atoms, ethylene glycol, propylene glycol, diethylene glycol, the mono and di ethers of the said glycols with lower aliphatic alcohols with from one to six carbon atoms, dioxan, tetrahydro furan and tetrahydrofuryl alcohol; and Step 2 Mixing the reaction mixture from Step 1 with at least one mineral acid or solution thereof; wherein the polyisocyanate is prepared by the reaction of (d) a compound or mixture of compounds containing on average two or more isocyanate groups per molecule, and (e) a compound or mixture of compounds with two or more groups selected from one or more of the groups: hydroxyl, thiol, primary amino, secondary amino or carboxylic acid;

and wherein for each mole of isocyanate groups of the polyisocyanate there is at least one mole of bisulphite ion or its equivalent;

and wherein the number of moles of tertiary amino groups in component (b) is not greater than the number of moles in (a) of bisulphite ions or their equivalents.

2. A method as claimed in claim 1, wherein there is from 1.05 to 1.5 moles of the bisulphite ion for each mole of the polyisocyanate.

3. A method as claimed in claim 1, wherein for each isocyanate group component (a) contains (1 + X) moles of bisulphite ions (or their equivalents) and component (b) contains X moles of tertiary amino groups, where X is from 0.1 to 0.5.

4. A method as claimed in claim 3, wherein X is from 0.2 to 0.4.

5. A method as claimed in claim 1, wherein the reactants (d) are those in which the isocyanate groups are attached to aromatic rings.

6. A method as claimed in claim 5, wherein the reactants (d) are selected from 2,4-tolylene diisocyanate, mixtures of 2,4- and 2,6-tolylene diisocyanates, and the isomeric diphenylmethanediisocyanates.

7. A method as claimed in claim 1, wherein the reactant (e) is a polypropylene oxide diol or triol, or a polyoxytetramethylene glycol.

8. A method as claimed in claim 1, wherein the bisulphite, metabisulphite or mixture of said salts of (a) are partially replaced by the corresponding sulphite salts.

9. A method as claimed in claim 1, wherein $R^1$, $R^2$ and $R^3$ are alkyl groups with from one to five carbon atoms, benzyl groups or groups in which $R^1$ and $R^2$ together form part of a saturated five or six membered ring.

10. A method as claimed in claim 9, wherein the tertiary amine components (b) are selected from trimethylamine, triethylamine, triethanolamine, dimethylethanolamine, tribenzylamine, N-ethylmorpholine, N-methylpiperidine and N-methylpyrollidine.

11. A method as claimed in claim 1, wherein the component (b) contains two tertiary amino groups.

12. A method as claimed in claim 11, wherein the component (b) is selected from tetra-N-methylethylene diamine, triethylene diamine (i.e. 1,4-diazabicyclo[2,2,2]octane) and 1,4-dimethylpiperazine.

13. A method as claimed in claim 1, wherein the component (b) is a tertiary amine having a pK value greater than 9.

14. A method as claimed in claim 1, wherein the solvent is selected from the group consisting of ethanol, n-propanol, iso-porpanol, 2-methoxyethanol, 2-ethoxyethanol, ethylene glycol dimethyl ether, and diethylene glycol dimethyl or diethyl ethers.

15. A method as claimed in claim 1, wherein the component (c) contains up to 25% by weight of water-immiscible solvent selected from the group consisting of ethyl acetate, diethyl ether, toluene, xylene, perchoroethylene, and the acetates of ethylene glycol monomethyl and monoethyl ethers.

16. A method as claimed in claim 1, wherein the component (c) contains up to 50% by weight of a water-miscible organic solvent selected from the group consisting of dimethyl formamide, dimethylacetamide, dimethyl sulfoxide, acetone, methyl ethyl ketone, hexamethyl phosphoro triamide and sulpholane.

17. A method as claimed in claim 1, wherein the mineral acid component is selected from hydrochloric, hydrobromic, sulphuric or phosphoric acids.

18. A composition containing a polycarbamoyl sulphonate prepared according to the method of claim 1.

* * * * *